United States Patent
Kim et al.

(10) Patent No.: US 10,296,379 B2
(45) Date of Patent: May 21, 2019

(54) METHOD FOR SCHEDULING THREADS IN A MANY-CORE SYSTEM BASED ON A MAPPING RULE BETWEEN THE THREAD MAP AND CORE MAP

(71) Applicant: ELECTRONICS AND TELECOMMUNICATIONS RESEARCH INSTITUTE, Daejeon (KR)

(72) Inventors: Kang Ho Kim, Daejeon (KR); Kwang Won Koh, Daejeon (KR); Jin Mee Kim, Daejeon (KR); Jeong Hwan Lee, Hwaseong (KR); Seung Hyub Jeon, Anyang (KR); Sung In Jung, Daejeon (KR); Yeon Jeong Jeong, Daejeon (KR); Seung Jun Cha, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 98 days.

(21) Appl. No.: 15/462,683

(22) Filed: Mar. 17, 2017

(65) Prior Publication Data

US 2017/0269966 A1    Sep. 21, 2017

(30) Foreign Application Priority Data

Mar. 18, 2016  (KR) .......... 10-2016-0032939

(51) Int. Cl.
*G06F 9/48* (2006.01)
*G06F 9/50* (2006.01)
(Continued)

(52) U.S. Cl.
CPC .......... *G06F 9/4881* (2013.01); *G06F 9/5027* (2013.01); *G06F 9/54* (2013.01); *G06F 1/329* (2013.01)

(58) Field of Classification Search
None
See application file for complete search history.

(56) References Cited

U.S. PATENT DOCUMENTS 7,657,890 B2 *   2/2010   Kanai ................ G06F 9/45533
                                                          711/100
7,861,060 B1 *  12/2010   Nickolls ................ G06F 9/522
                                                          712/22

(Continued)

OTHER PUBLICATIONS

Nita et al, Efficient threads mapping on multicore architecture, 2010, IEEE, 8th International Conference on Communications (pp. 53-56) (Year: 2010).*

(Continued)

*Primary Examiner* — Abu Ghaffari

(57) ABSTRACT

Scheduling threads in a system with many cores includes generating a thread map where a connection relationship between a plurality of threads is represented by a frequency of inter-process communication (IPC) between threads, generating a core map where a connection relationship between a plurality of cores is represented by a hop between cores, and respectively allocating the plurality of threads to the plurality of cores defined by the core map, based on a thread allocation policy defining a mapping rule between the thread map and the core map.

14 Claims, 8 Drawing Sheets

(51) Int. Cl.
*G06F 9/54* (2006.01)
*G06F 1/329* (2019.01)

(56) References Cited

U.S. PATENT DOCUMENTS

| | | | | |
|---|---|---|---|---|
| 8,203,954 | B1* | 6/2012 | Patel | H04L 45/00 370/235 |
| 8,336,056 | B1* | 12/2012 | Gadir | G06F 9/5027 718/100 |
| 8,954,975 | B2* | 2/2015 | Kim | G06F 9/4887 718/103 |
| 9,424,092 | B2* | 8/2016 | Singh | G06F 9/5027 |
| 9,495,139 | B2* | 11/2016 | Stitt | G06F 9/4484 |
| 9,600,346 | B2* | 3/2017 | Kuesel | G06F 9/4881 |
| 9,632,822 | B2* | 4/2017 | Chang | G06F 9/50 |
| 9,652,027 | B2* | 5/2017 | Sharda | G06F 1/329 |
| 9,836,334 | B2* | 12/2017 | Divirgilio | G06F 9/3851 |
| 9,983,910 | B2* | 5/2018 | Lee | G06F 9/5038 |
| 2004/0015684 | A1* | 1/2004 | Peterson | G06F 9/3851 712/245 |
| 2006/0150187 | A1* | 7/2006 | Vaddagiri | G06F 9/4843 718/102 |
| 2008/0229220 | A1* | 9/2008 | Jing | G06F 8/34 715/763 |
| 2008/0320487 | A1* | 12/2008 | Fontenot | G06F 9/505 718/105 |
| 2011/0145461 | A1* | 6/2011 | Zhao | G06F 9/4812 710/267 |
| 2012/0144395 | A1* | 6/2012 | Bohrer | G06F 9/546 718/103 |
| 2012/0192198 | A1* | 7/2012 | Becchi | G06F 12/0284 718/104 |
| 2013/0117753 | A1* | 5/2013 | Gounares | G06F 9/546 718/102 |
| 2013/0212594 | A1 | 8/2013 | Choi et al. | |
| 2014/0208331 | A1* | 7/2014 | Li | G06F 9/5044 718/105 |
| 2015/0186184 | A1 | 7/2015 | Kim | |
| 2015/0277985 | A1* | 10/2015 | Abraham | G06F 9/5077 718/1 |
| 2016/0103709 | A1* | 4/2016 | Zhang | G06F 9/4881 718/103 |
| 2016/0253212 | A1* | 9/2016 | Solihin | G06F 9/5033 718/104 |
| 2016/0357604 | A1* | 12/2016 | Kurihara | G06F 9/4881 |
| 2017/0192779 | A1* | 7/2017 | Webber | G06F 9/3851 |

OTHER PUBLICATIONS

Mohan Rajagopalan et al., "Thread Scheduling for Multi-Core Platforms", HotOS2007, May 7, 2007, pp. 1-6, San Diego, USA.

Pierre-Louis Aublin et al., "ZIMP: Efficient Inter-core Communications on Manycore Machines", Technical Report, Oct. 31, 2013, pp. 1-28, akupaku.me/plaublin/zimp/zimb_TR.pdf.

* cited by examiner

METHOD FOR SCHEDULING THREADS IN A MANY-CORE SYSTEM BASED ON A MAPPING RULE BETWEEN THE THREAD MAP AND CORE MAP

CROSS-REFERENCE TO RELATED APPLICATIONS

This application claims priority under 35 U.S.C. § 119 to Korean Patent Application No. 10-2016-0032939, filed on Mar. 18, 2016, the disclosure of which is incorporated herein by reference in its entirety.

TECHNICAL FIELD

The present invention relates to a thread scheduling method and apparatus, and more particularly, to thread scheduling in which a plurality of threads are allocated to a plurality cores in a many-core system.

BACKGROUND

A many-core central processing unit (CPU) denotes a CPU where 100 or 1,000 or more cores are integrated into one chip. A multicore CPU is being widely used at present, and the many-core CPU is expected to be widely used in the near future.

As interest in many-core processors increases, interest in a microkernel-based operating system (OS) for the many-core processors is increasing.

A collaboration between processes (or threads which are a subordinate concept of the processes) executed in the microkernel-based OS uses a message transfer method based on inter-process communication (IPC). This denotes that a performance of the IPC is closely associated with a performance of the microkernel-based OS.

Among various factors affecting the performance of the IPC, a factor affecting the performance of the IPC in a structure of the many-core CPU is a hop between cores included in the many-core CPU.

If the number of cores is 100, a message is transferred via a maximum of 20 hops, and if the number of cores is 1,000, a message is transferred via about 64 hops. A time taken in transferring a message via one hop is a one CPU cycle.

Considering that a time taken in unidirectional IPC is 36 to 316 CPU cycles in a conventional microkernel, a hop between cores to which a thread for performing IPC in a many-core is allocated affects IPC performance greatly.

Therefore, thread allocation where threads are allocated to cores in consideration of a hop between the cores is a very important factor for enhancing IPC performance. However, a thread allocation method for greatly enhancing IPC performance is not proposed yet.

SUMMARY

Accordingly, the present invention provides a thread scheduling method and apparatus for enhancing IPC performance.

In one general aspect, a method of scheduling threads in a many-cores system operating based on many-core processors including a plurality of cores includes: generating a thread map where a connection relationship between a plurality of threads is represented by a frequency of inter-process communication (IPC) between threads; generating a core map where a connection relationship between the plurality of cores is represented by a hop between cores; and respectively allocating the plurality of threads to the plurality of cores defined by the core map, based on a thread allocation policy defining a mapping rule between the thread map and the core map.

In another general aspect, an apparatus for scheduling threads in a many-cores system operating based on many-core processors including a plurality of cores includes: a storage unit configured to store a thread allocation policy defining a mapping rule between a thread map, where a connection relationship between a plurality of threads is represented by a frequency of inter-process communication (IPC) between threads, and a core map where a connection relationship between the plurality of cores is represented by a hop between cores; and a scheduler configured to respectively allocate the plurality of threads to the plurality of cores, based on the thread allocation policy stored in the storage unit.

Other features and aspects will be apparent from the following detailed description, the drawings, and the claims.

DETAILED DESCRIPTION OF EMBODIMENTS

Figure 1:
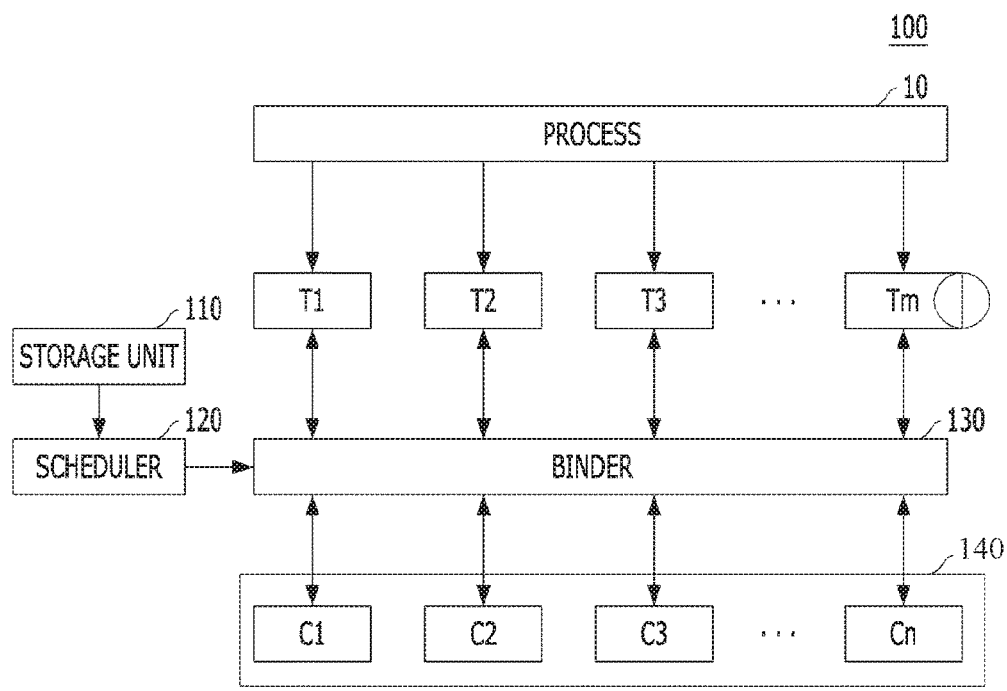
FIG. 1 is a block diagram illustrating a many-core system according to an embodiment of the present invention.

Hereinafter, example embodiments of the present invention will be described in detail with reference to the accompanying drawings. Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In various embodiments of the disclosure, the meaning of 'comprise', 'include', or 'have' specifies a property, a region, a fixed number, a step, a process, an element and/or a component but does not exclude other properties, regions, fixed numbers, steps, processes, elements and/or components.

As used herein, the term "or" includes any and all combinations of one or more of the associated listed items. For example, "A or B" may include A, include B, or include A and B.

It will be understood that, although the terms first, second, etc. used herein may qualify various elements according to various embodiments, these elements should not be limited by these terms. For example, the terms do not limit the order and/or importance of corresponding elements. These terms are only used to distinguish one element from another. For example, a first user equipment and a second user equipment are user equipment and denote different user equipment. For example, a first element may be referred to as a second element without departing from the spirit and scope of the present invention, and similarly, the second element may also be referred to as the first element.

In the case in which a component is referred to as being "connected" or "accessed" to other component, it should be understood that not only the component is directly connected or accessed to the other component, but also there may exist another component between the components. Meanwhile, in the case in which a component is referred to as being "directly connected" or "directly accessed" to other component, it should be understood that there is no component therebetween.

FIG. 1 is a block diagram illustrating a many-core system 100 according to an embodiment of the present invention.

Referring to FIG. 1, the many-core system 100 according to an embodiment of the present invention may respectively allocate a plurality of threads to a plurality of cores, based on a frequency of inter-process communication (IPC) between threads. Due to such a thread allocation policy, a hop (a hop between two cores to which two threads are respectively allocated) between two threads for performing IPC is minimized in a microkernel-based many-core OS, and thus, IPC performance is enhanced.

In detail, the many-core system 100 may include a storage unit 110, a scheduler 120, a binder 130, and a many-core processor (or a many-core CPU) 140.

The storage unit 110 may store thread allocation policy information (hereinafter referred to as a thread allocation policy) based on thread map information (hereinafter referred to as a thread map) and core map information (hereinafter referred to as a core map).

The thread map may be an information map where a connection relationship between a plurality of threads T1 to Tm generated by a process 10 is represented by a frequency of IPC, and the core map may be an information map where a connection relationship between a plurality of cores C1 to Cn included in the many-core processor 140 is represented by a hop between cores. The thread map and the core map will be described below in detail.

The thread allocation policy may be a policy for respectively allocating the plurality of threads T1 to Tm to the plurality of cores C1 to Cn and may define a mapping rule between the thread map and the core map.

The scheduler 120 may generate a thread allocation command for respectively allocating the plurality of threads T1 to Tm to the plurality of cores C1 to Cn, based on the thread allocation policy stored in the storage unit 110 and may output the thread allocation command to the binder 130.

The binder 130 may respectively connect the plurality of threads T1 to Tm to the plurality of cores C1 to Cn according to the thread allocation command. Therefore, each of the plurality of threads T1 to Tm may be executed by a core connected thereto.

Hereinafter, a thread map and a core map will be described with reference to FIGS. 2 and 3.

A thread map and a core map according to an embodiment of the present invention may be defined for respectively allocating a plurality of threads to a plurality of cores, based on a frequency of IPC.

Figure 2:
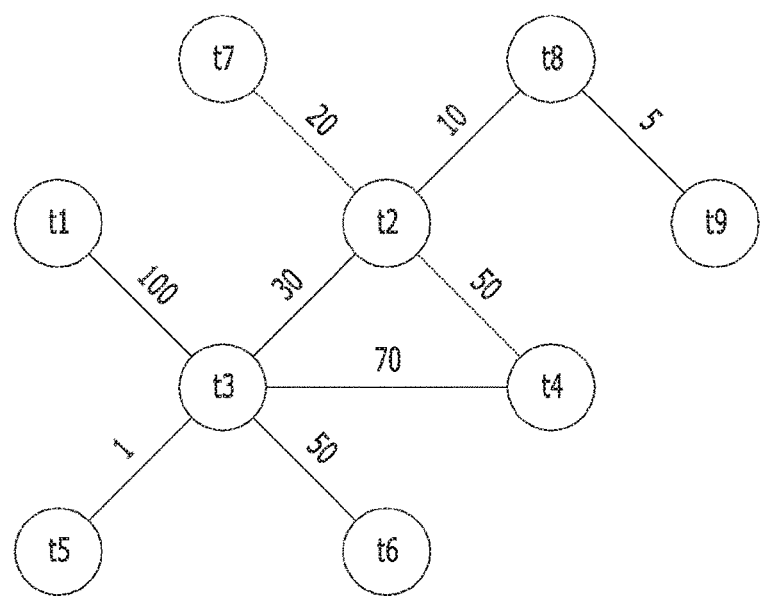
FIG. 2 is a diagram illustrating a thread map according to an embodiment of the present invention.

First, as illustrated in FIG. 2, the thread map may be expressed as an undirected graph. In order to help understanding, in FIG. 2, a thread map consisting of nine threads is illustrated exemplarily.

The thread map according to an embodiment of the present invention may include nine vertexes t1 to t9 and a plurality of edges that connect the nine vertexes t1 to t9. That is, in the thread map, nine threads T1 to T9 may be respectively configured with the nine vertexes t1 to t9, and the nine vertexes t1 to t9 may be connected by the edges. In this case, each of the edges may denote occurrence of IPC, and in FIGS. 2, 1, 5, 10, 20, 30, 50, 70, and 100 illustrated on the respective edges each represent a frequency of IPC performed between threads. Here, the frequency of IPC may be measured from the number of application program interface (API) calls associated with IPC.

Figure 3:
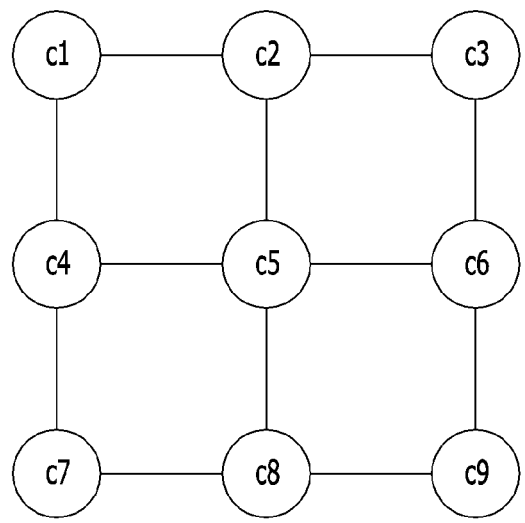
FIG. 3 is a diagram illustrating a core map according to an embodiment of the present invention.

Similarly, as illustrated in FIG. 3, the core map may be expressed as an undirected graph. In order to help understanding, in FIG. 3, a core map consisting of nine cores is illustrated exemplarily.

The core map according to an embodiment of the present invention may include nine vertexes c1 to c9 and a plurality of edges that connect the nine vertexes c1 to c9. That is, in the core map, nine cores C1 to C9 may be respectively configured with the nine vertexes c1 to c9, and the nine vertexes c1 to c9 may be connected by the edges. In this case, each of the edges represents a hop.

In allocating a thread to a core, in order to maximize a system throughput, the average IPC cost "E" of all threads should be minimized.

The average IPC cost "E" may be calculated as expressed in the following

Equation (1):

$$E=(1/W)*\text{sum}(Wt(e)*d(m(v),m(w))), \text{ for each } e=(v,w) \quad (1)$$

where e denotes an edge indicating whether IPC is performed between a thread "v" and a thread "w", Wt(e) denotes a frequency of IPC occurring in the edge "e", W denotes a total sum of frequencies of IPC "Wt(e)", m( ) denotes a one-to-one mapping function defining a mapping rule between a thread and a core, m(v) denotes a core to which the thread "v" is allocated based on the mapping function, and m(w) denotes a core to which the thread "w" is allocated based on the mapping function. Also, d(m(v), m(w)) denotes a distance between the core "m(v)" and the core "m(w)". Here, the distance may be represented by a hop and may be the minimum number of edges connecting the core "m(v)" and the core "m(w)".

As seen through Equation (1), the average IPC cost "E" may be determined by the distance "d(m(v), m(w))".

Figure 4:
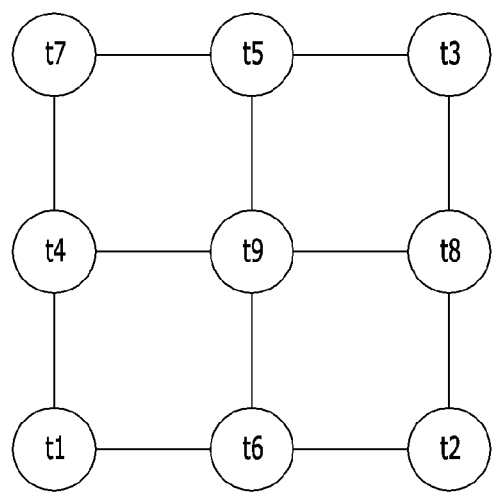
FIG. 4 is a diagram illustrating an example where threads illustrated in FIG. 1 are arbitrarily allocated to cores illustrated in FIG. 2.
Figure 5:
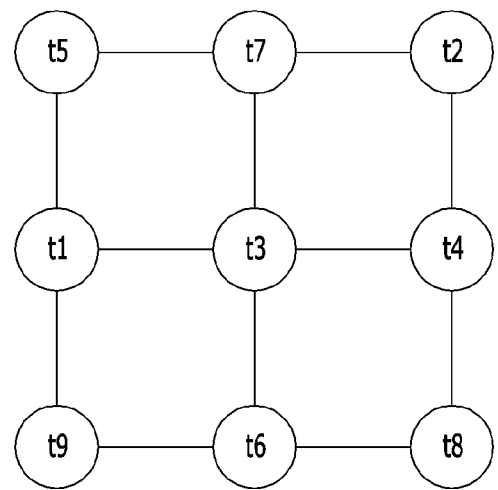
FIG. 5 is a diagram illustrating an example where the threads illustrated in FIG. 1 are allocated to the cores illustrated in FIG. 2 in consideration of a frequency of IPC between the threads, according to an embodiment of the present invention.

FIG. 4 is a diagram illustrating an example where threads are arbitrarily allocated to cores illustrated in FIG. 3 with no consideration of a frequency of IPC between the threads. FIG. 5 is a diagram illustrating an example where threads are allocated to cores in consideration of a frequency of IPC between the threads, according to an embodiment of the present invention.

By using Equation (1), the average IPC cost "E" calculated based on a thread allocation result of FIG. 4 is 3.17, and the average IPC cost "E" calculated based on a thread allocation result of FIG. 5 is 1.14.

Therefore, it can be seen that the average IPC cost "E" is lower in a case, where a plurality of threads are respectively allocated to a plurality of cores based on the thread allocation policy according to an embodiment of the present invention, than a case where a plurality of threads are respectively allocated to a plurality of cores arbitrarily.

Hereinafter, a method of respectively allocating a plurality of threads to a plurality of cores according to an embodiment of the present invention will be described in detail.

Figure 6A:
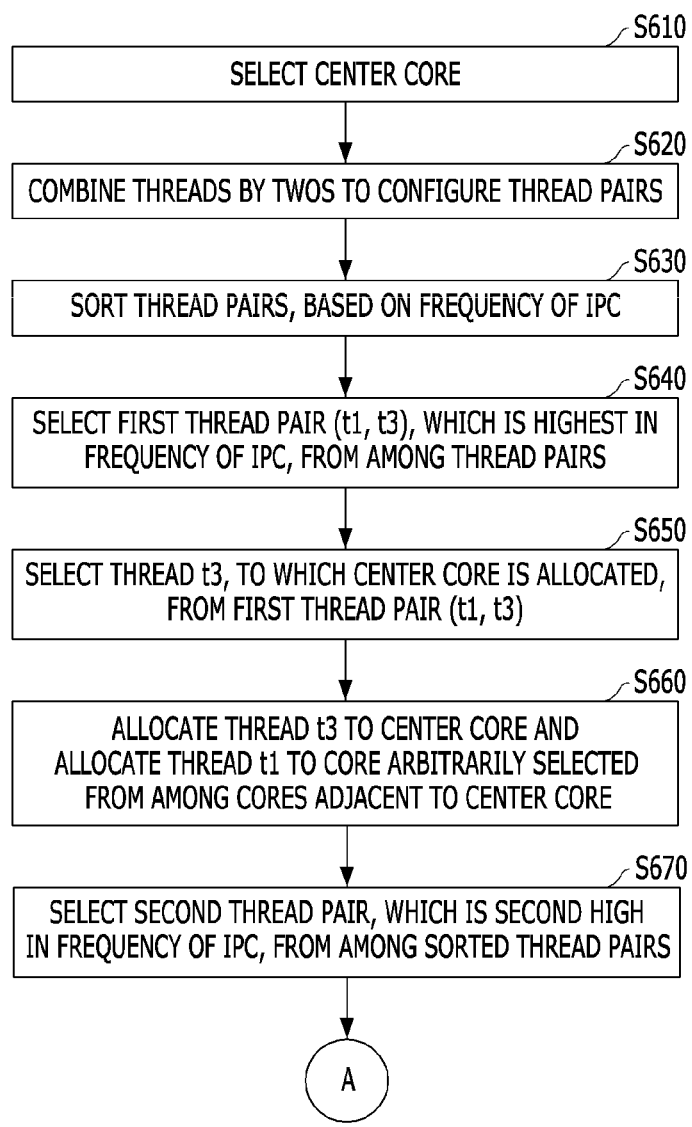
FIGS. 6A and 6B are flowcharts illustrating a thread allocation method according to an embodiment of the present invention.
Figure 6B:
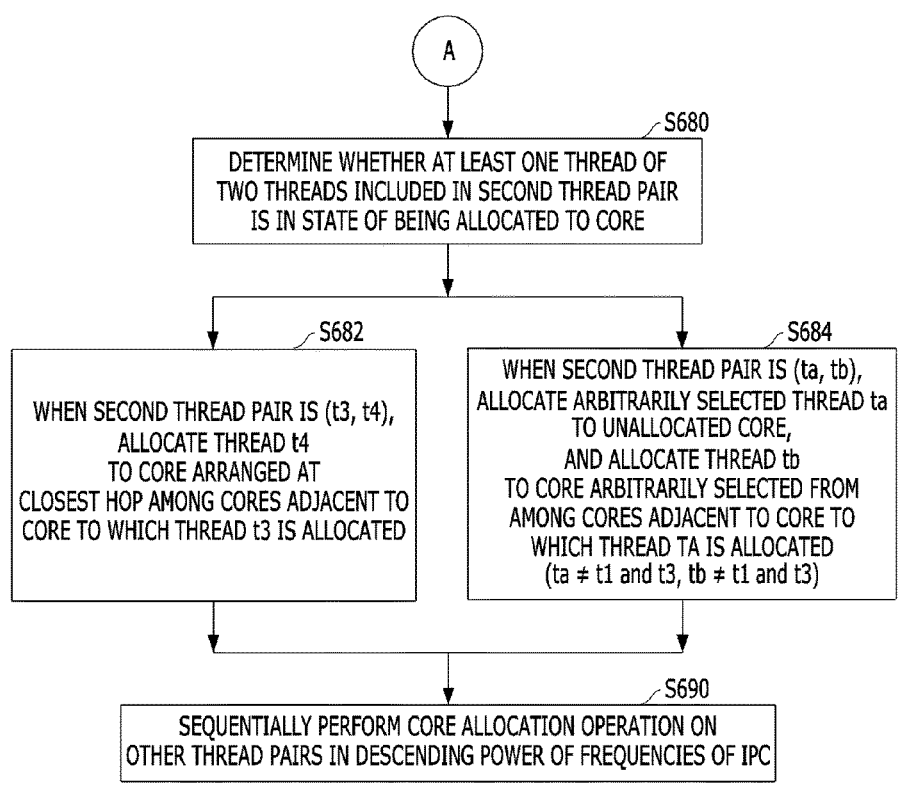

FIGS. 6A and 6B are flowcharts illustrating a thread allocation method according to an embodiment of the present invention.

Referring to FIG. 6A, in step S610, a center core Gc may be selected from a core map.

A core, arranged at a position where a sum of hops to all cores is the minimum, may be selected as the center core from the core map. When the core map illustrated in FIG. 3 is assumed, a core located at a vertex c5 may be selected as the center core.

Subsequently, in step S620, a plurality of thread pairs may be configured by combining, by twos, a plurality of threads generated by a process.

Subsequently, in step S630, frequencies of IPC may be sorted in descending power, and the plurality of threads may be sorted in order in which the frequencies of IPC are sorted. When a thread map having an IPC frequency distribution illustrated in FIG. 2 is assumed, a plurality of thread pairs and a frequency of IPC corresponding to each of the thread pairs may be sorted as listed in the following Table 1.

TABLE 1

| Rank | Thread Pair | Frequency of IPC |
|---|---|---|
| 1 | (t1, t3) | 100 |
| 2 | (t3, t4) | 70 |
| 3 | (t2, t4) | 50 |
| 4 | (t3, t6) | 50 |
| 5 | (t3, t2) | 30 |
| 6 | (t2, t7) | 20 |
| 7 | (t2, t8) | 10 |
| 8 | (t8, t9) | 5 |
| 9 | (t3, t5) | 1 |

In a sorting process, when there are thread pairs having the same frequency of IPC, the order of each of the thread pairs may be determined as an arbitrary order. Therefore, in Table 1, No. 3 rank thread pair (t2, t4) may be arranged in No. 4 rank, and No. 4 rank thread pair (t3, t6) may be arranged in No. 3 rank.

Subsequently, in step S640, a thread pair which is the highest in frequency of IPC may be selected from the sorted plurality of thread pairs. In Table 1, a thread pair which is the highest in frequency of IPC may be (t1, t3). Hereinafter, a thread pair which is the highest in frequency of IPC may be referred to as a first thread pair.

Subsequently, in step S650, a thread allocated to the center core may be selected from among two threads included in the first thread pair.

A thread which is to be allocated to the center core may be selected based on a total sum of all frequencies of IPC occurring in the threads included in the first thread pair.

For example, when the thread map having the IPC frequency distribution illustrated in FIG. 2 is assumed, in the thread pair (t1, t3) which is the highest in frequency of IPC, a total sum of all frequencies of IPC occurring in a thread t3 may be 251(=100+70+50+30+1), and a total sum of all frequencies of IPC occurring in a thread t1 may be 100.

Therefore, since the total sum of all the frequencies of IPC occurring in the thread t3 is greater than the total sum of all the frequencies of IPC occurring in the thread t1, the thread t3 may be selected as a thread which is to be allocated to the center core.

Subsequently, in step S660, when the thread which is to be allocated to the center core is selected, the selected thread may be allocated to the center core, and an unselected thread may be allocated to a core arbitrarily selected from among cores adjacent to the center core.

Figure 7:
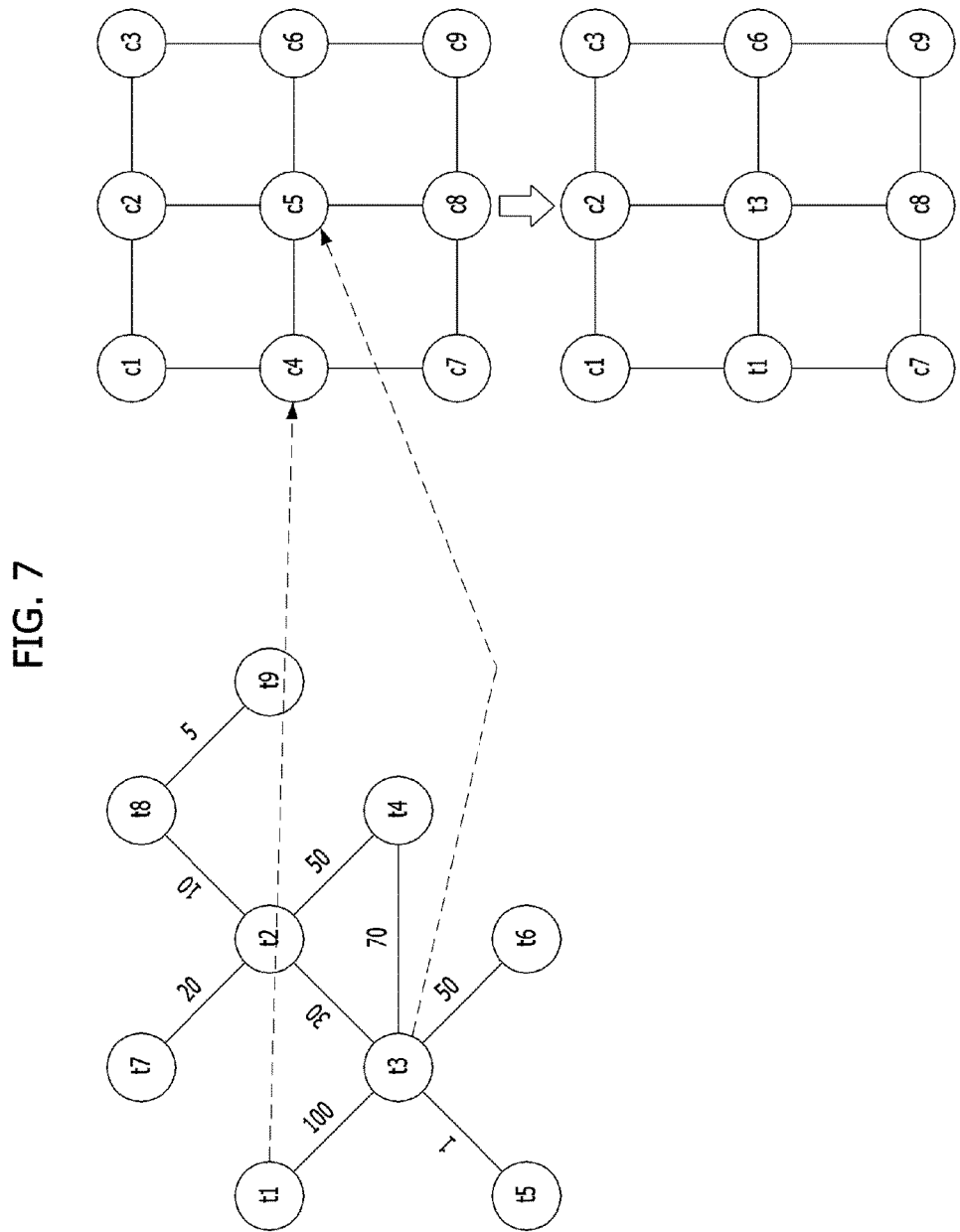
FIG. 7 is a diagram illustrating an example where a thread pair which is the highest in frequency of IPC is allocated to a core, according to an embodiment of the present invention.

For example, when the thread pair (t1, t3) which is the highest in frequency of IPC is allocated to a core included in the core map of FIG. 3, as illustrated in FIG. 7, the thread t3 may be allocated to a center core c5 selected from the core map, and the thread t1 may be allocated to one core arbitrarily selected from among cores c1, c2, c2, c3, c4, c6, c7, and c8 adjacent to the center core c5. FIG. 7 illustrates an example where the thread t1 is allocated to a core c4.

Subsequently, in step S670, when core allocation for the first thread pair has been completed, a thread pair which is second high in frequency of IPC may be selected from among the thread pairs which have been sorted in step S630. For example, when the thread map having the IPC frequency distribution illustrated in FIG. 2 is assumed, a thread pair (t3, t4) which is second high in frequency of IPC may be selected. Hereinafter, the thread pair which is second high in frequency of IPC may be referred to as a second thread pair.

Referring to FIG. 6B, subsequently, in step S680, whether at least one thread of two threads included in the second thread pair is in a state of being already allocated to a core may be determined.

When one of the two threads is in a state of being already allocated to the core, the thread allocation method may proceed to step S682, but when all of the two threads is not in a state of being already allocated to the core, the thread allocation method may proceed to step S684.

In step S682, when one of the two threads included in the second thread pair has been already allocated to the core, another unselected thread may be allocated to a core arbitrarily selected from among cores adjacent to the core to which the one thread has been already allocated.

Figure 8:
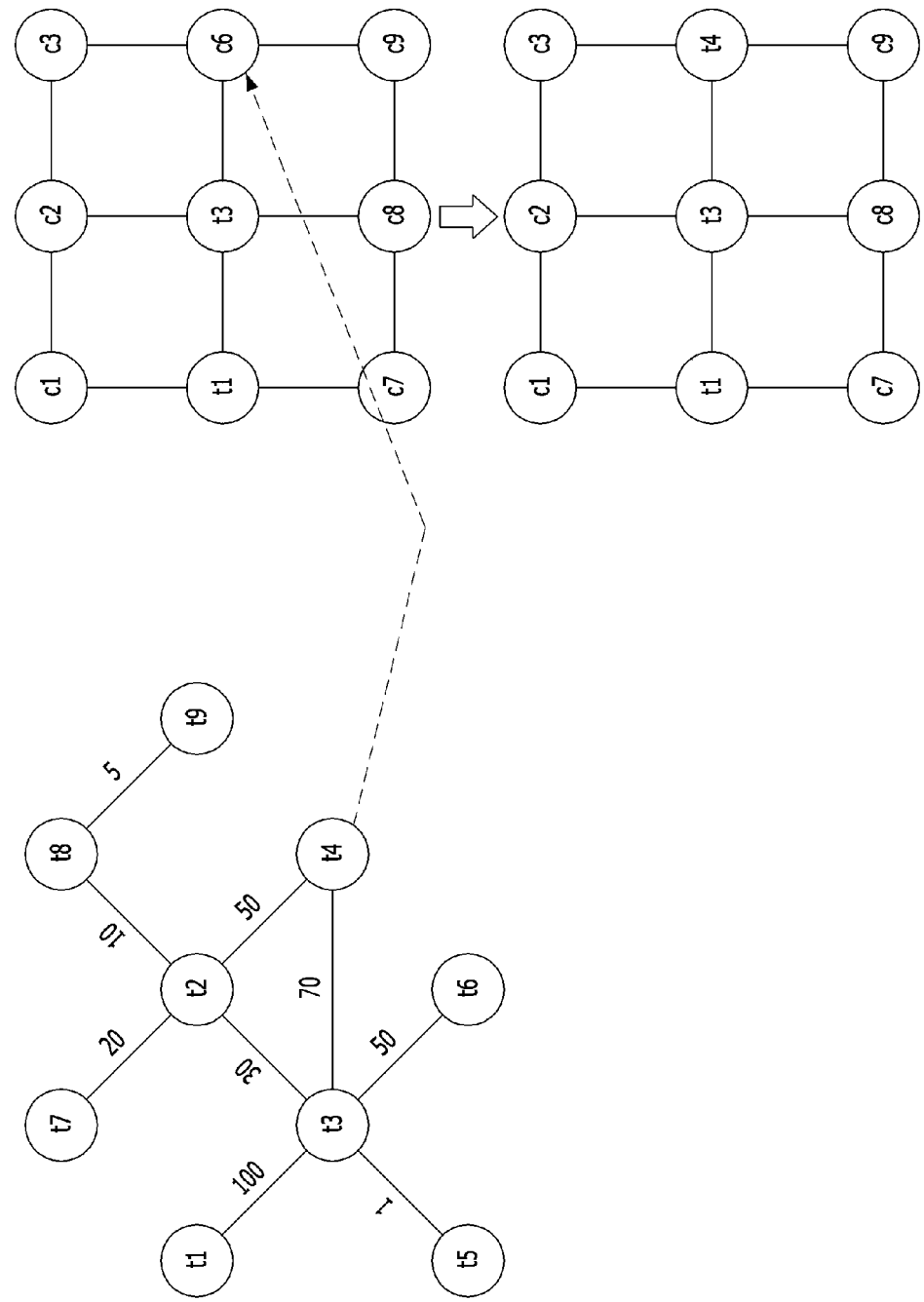
FIG. 8 is a diagram illustrating an example where a thread pair which is second high in frequency of IPC is allocated to a core, according to an embodiment of the present invention.

For example, if the thread pair which has been selected in step S670 is (t3, t4), the thread t3 may be in a state of being already allocated to the core in an operation of allocating the first thread pair (t3, t1) to the core, and thus, only an operation of allocating a thread t4 to a core may be performed. In this case, as illustrated in FIG. 8, the thread t4 may be allocated to a core arbitrarily selected from among cores c2, c6, and c8 arranged at a hop closest to the core c5 to which the thread t3 is allocated. FIG. 8 illustrates an example where the thread t4 is allocated to a core c6.

The core c4 is a core arranged at the hop closest to the core c5 to which the thread t3 is allocated, but is a core to which the thread t1 has been already allocated in an operation of allocating the first thread pair (t1, t3), which is the highest in frequency of IPC, to the core. Therefore, the core c4 is excluded from a candidate core to which the thread t4 is to be allocated.

When all of two threads included in the second thread pair are not in a state of being allocated to a core, in step S684, one thread arbitrarily selected from among the two threads included in the second thread pair may be allocated to a core arbitrarily selected from among cores to which a thread is not allocated, and an unselected thread of the two threads included in the second thread pair may be allocated to a core arbitrarily selected from among cores adjacent to the core to which the arbitrarily selected one thread is allocated.

Subsequently, in step S690, a core allocation operation may be sequentially performed on the other thread pairs in descending power of frequencies of IPC.

That is, when the core allocation operation has been performed on a thread pair which is third high in frequency of IPC, the core allocation operation may be performed on a thread pair which is fourth high in frequency of IPC.

Figure 9:
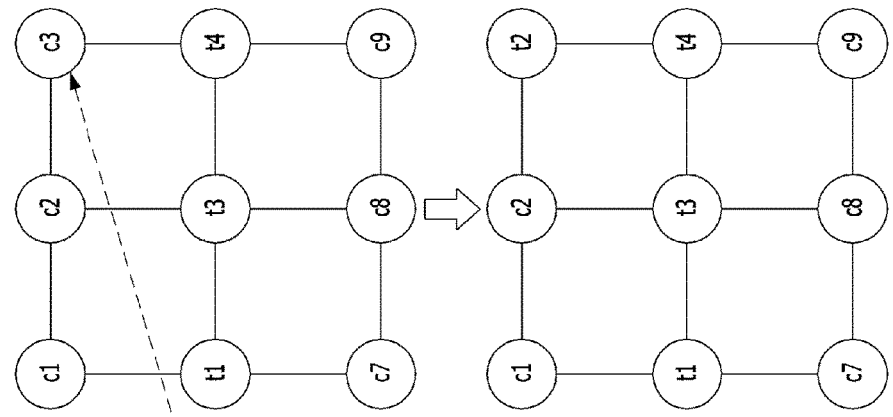
FIG. 9 is a diagram illustrating an example where a thread pair which is third high in frequency of IPC is allocated to a core, according to an embodiment of the present invention.
Figure 9:
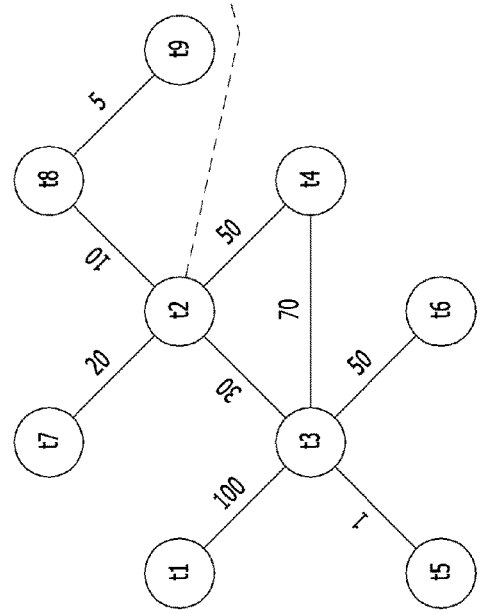

For example, a thread pair (t2, t4) or a thread pair (t3, t6) which is third high in frequency of IPC may be selected from the thread map of FIG. 2. In this case, an operation of allocating a thread pair (t2, t4) to a core may be performed based on the ranks of Table 1. Here, as illustrated in FIG. 8, since the thread t4 is a thread which has been already allocated to the core c6 in an operation of allocating the second thread pair (t3, t4) to the core, only the thread t2 of the thread pair (t2, t4) may be allocated to a core. That is, the thread t2 may be allocated to a core, which is arranged at a hop closest to the core c6 to which the thread t4 is allocated, among cores to which a thread is not allocated yet. An example where the thread t2 is allocated to the core is illustrated in FIG. 9, and FIG. 9 illustrates an example where the thread t2 is allocated to the core c3 among the cores c3 and c9 arranged at a hop closest to the core c6 to which the thread t4 is allocated.

Subsequently, the other threads (t3, t6), (t3, t2), (t2, t7), (t2, t8), (t8, t9), and (t3, t5) may be sequentially allocated to cores. An operation of respectively allocating the threads (t3, t6), (t3, t2), (t2, t7), (t2, t8), (t8, t9), and (t3, t5) to the cores can be sufficiently understood through the descriptions on steps S610 to S690, and thus, its detailed description is not provided. A result where all thread pairs are allocated to cores is illustrated in FIG. 5.

As described above, in an embodiment of the present invention, since threads are allocated to a plurality of cores integrated into a many-core in consideration of a frequency of IPC between the threads, IPC performance associated with a system throughput and the IPC cost can be enhanced.

Furthermore, if the many-core system for scheduling threads according to an embodiment of the present invention is applied to electronic devices, a performance of the many-core system can be enhanced.

The many-core system according to an embodiment of the present invention may be applied to various electronic devices. For example, examples of the electronic devices may include at least one of a smartphone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

Moreover, it is obvious to those skilled in the art that devices to which the many-core system according to an embodiment of the present invention is applied are not limited to the above-described devices, and the many-core system according to an embodiment of the present invention may be applied to all devices including a many-core processor including a plurality of cores integrated into a single chip without being limited to the kinds of devices.

According to the embodiments of the present invention, since threads are allocated to a plurality of cores integrated into a many-core in consideration of a frequency of IPC between the threads, IPC performance associated with a system throughput and the IPC cost can be enhanced.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of scheduling threads in a many-cores system operating based on many-core processors including a plurality of cores, the method comprising:
generating a thread map where a connection relationship between a plurality of threads is represented by a frequency of inter-process communication (IPC) between all pairs of threads in the plurality of threads;
generating a core map where a connection relationship between the plurality of cores is represented by hops between each of the plurality of cores; and
respectively allocating the plurality of threads to the plurality of cores defined by the core map, based on a thread allocation policy defining a mapping rule between the thread map and the core map
wherein the respectively allocating of the plurality of threads to the plurality of cores comprises:
combining the plurality of threads by twos to configure a plurality of thread pairs;
selecting a first thread pair, which is the highest in frequency of IPC between the threads, from among the plurality of thread pairs;
allocating a thread, selected front among two threads included in the first thread pair, to a center core; and
allocating another unselected thread of the two threads to a core arbitrarily selected from among cores adjacent to the center core.

2. The method of claim 1, wherein the generating of the thread map comprises:
configuring the plurality of threads with a plurality of vertexes, respectively; and
connecting the plurality of vertexes by using an edge representing the frequency of IPC.

3. The method of claim 1, wherein the generating of the core map comprises:
configuring the plurality of cores with a plurality of vertexes, respectively; and
connecting the plurality of vertexes by using an edge representing the hop.

4. The method of claim 1, wherein the center core is a core arranged at a position where a sum of hops to all cores is the minimum.

5. The method of claim 1, wherein in the allocating of the thread to the center core, a total sum of all frequencies of IPC occurring in the selected thread is greater than a total sum of all frequencies of IPC occurring in the other unselected thread.

6. The method of claim 1, further comprising:
after the allocating of the thread to the selected core,
selecting a second thread pair, which is second high in frequency of IPC between the threads, from among the plurality of thread pairs; and
when one thread of two threads included in the second thread pair has been already allocated to one core of the center core and the arbitrarily selected core, allocating another one thread included in the second thread pair to a core arranged at a hop closest to the one core to which the one thread has been already allocated.

7. The method of claim 1, further comprising:
after the allocating of the thread to the selected core,
selecting a second thread pair, which is second high in frequency of IPC between the threads, from among the plurality of thread pairs;
when all of two threads included in the second thread pair are not in a state of being allocated to the center core or the arbitrarily selected core, allocating a thread, selected from among the two threads included in the second thread pair, to a core arbitrarily selected from among other cores except the center core and the arbitrarily selected core; and
allocating an unselected thread of the two threads, included in the second thread pair, to a core arbitrarily selected from among cores adjacent to a core to which the selected thread of the two threads included in the second thread pair is allocated.

8. An electronic that includes a many-core system for scheduling threads by using the method of claim 1, the many core system including a many-core processor.

9. A many-core system comprising:
a memory that stores a thread allocation policy defining a mapping rule between a thread map, where a connection relationship between a plurality of threads is represented by a frequency of inter-process communication (IPC) between all pairs of threads in the plurality of threads, and a core map where a connection relationship between the plurality of cores is represented by hops between each of the plurality of cores; and
a scheduler that is configured to perform the following operations:
respectively allocating the plurality of threads to the plurality of cores, based on the thread allocation policy stored in the storage unit;
selecting two threads, which are the highest in frequency of IPC, from among the plurality of threads according to the thread allocation policy;
allocating a thread selected from among the selected two threads to a center core of the plurality of cores; and
allocating another unselected thread of the two threads to a core arbitrarily selected from among cores adjacent to the center core.

10. The apparatus of claim 9, wherein the thread map is a map where a plurality of vertexes respectively corresponding to the plurality of threads are connected to each other by using an edge representing the frequency of IPC.

11. The apparatus of claim 9, wherein the core map is a map where a plurality of vertexes respectively corresponding to the plurality of cores are connected to each other by using an edge representing the hop.

12. The apparatus of claim 9, wherein the center core is a core arranged at a position where a sum of hops to all cores is the minimum.

13. The apparatus of claim 9, wherein a total sum of all frequencies of IPC occurring in the selected thread is greater than a total sum of all frequencies of IPC occurring in the other unselected thread.

14. The apparatus of claim 9, wherein the scheduler is further configured to:
select two threads, which are second high in frequency of IPC, from among the plurality of threads according to the thread allocation policy, and
when one thread of the two threads which are second high in frequency of IPC is in a state of being allocated to the center core or the arbitrarily selected core, allocates another one thread to a core arbitrarily selected from among cores adjacent to the center core or the arbitrarily selected core.

* * * * *